May 6, 1924.　　　　　　　　　　　　　　　　　　　　　　　1,492,699

L. RASCH

CREAM SEPARATOR

Filed Jan. 24, 1922

Inventor
Ludvik Rasch
By B. Singer Atty.

Patented May 6, 1924.

1,492,699

UNITED STATES PATENT OFFICE.

LUDVIK RASCH, OF CHRISTIANIA, NORWAY, ASSIGNOR TO AKTIESELSKAPET TURBO-SEPARATOR, OF DRAMMEN, NORWAY.

CREAM SEPARATOR.

Application filed January 24, 1922. Serial No. 531,507.

*To all whom it may concern:*

Be it known that I, LUDVIK RASCH, a subject of the King of Norway, residing at Christiania, Magnus gate 7, Norway, have invented new and useful Improvements in Cream Separators, of which the following is a specification.

The present invention relates to cream separators and has especially for its object a bowl-construction in which is secured a free passage of the cream to the regulated outlet so that the latter may be arranged comparatively near to the axis of the bowl.

Further the invention has for its object an arrangement preventing effectively the skim-milk from leaking to the cream outlet and vice versa.

Further the invention has for its object an arrangement securing also a free outlet of the milk so that also for the skim-milk the frothing only takes place in the outlet.

By means of the said arrangements an improved skimming power is obtained the quantity of cream being easily and accurately regulated and a free outlet being obtained without obstruction owing to froth and mud which might reduce the skimming power.

The invention is illustrated in the enclosed drawing in which.

Figure 1:
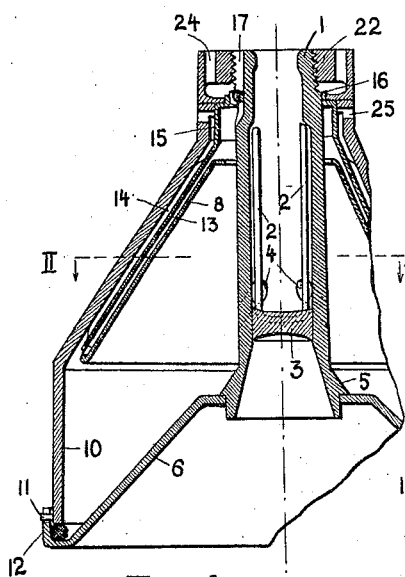
Fig. 1 shows an axial vertical section through a centrifugal bowl according to the invention a plurality of the separating discs being removed.
Figure 3:
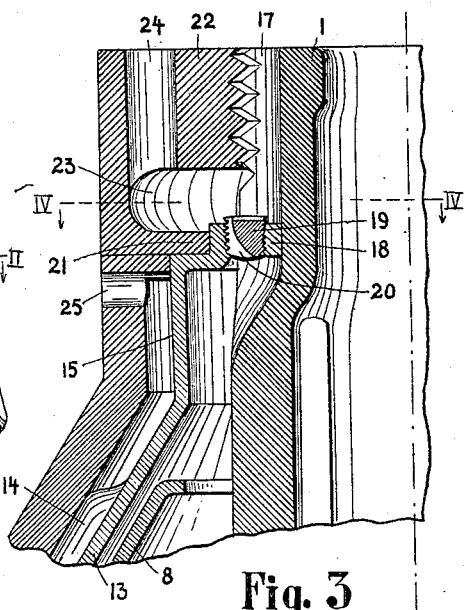
Fig. 3 is a partial section showing the arrangement of the milk and cream outlet upon an enlarged scale.
Figure 2:
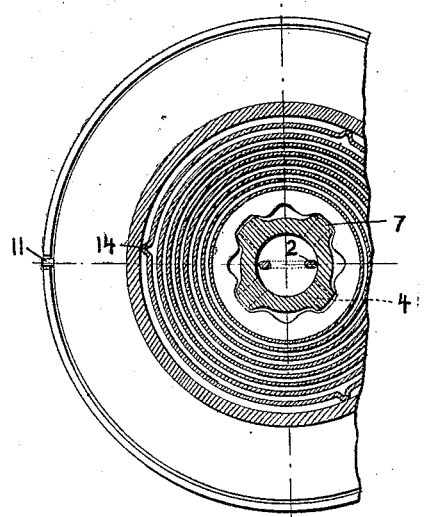
Fig. 2 is a horizontal section on the line II—II, Fig. 1, the discs being in place.
Figure 4:
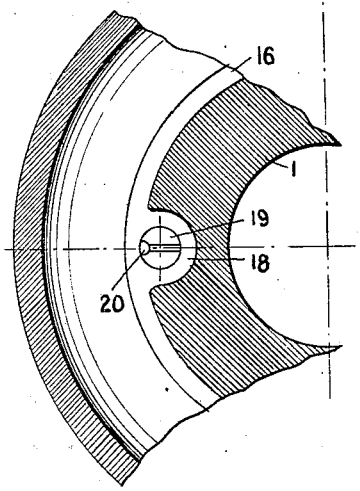
Fig. 4 is a plan view corresponding to Fig. 3.

In the drawing 1 designates the inlet-pipe for the whole milk. The lower part of the pipe is widened in order to give place to bars 2 adapted to impart a rotary motion to the milk during its passage downwards through the pipe. 3 designates a bottom above which the outlet openings 4 are arranged. Beneath the bottom 3 the pipe has a conical form so as to take up the centering mechanism. The pipe 1 is by means of a conical collar 5 joined to the conical bottom 6 of the bowl. The pipe 1 is provided with outer axial ribs 7 adapted to enter into corresponding recesses in the discs 8, 10 designates the casing of the bowl.

The connection between the casing 10 and the bottom 6 is secured by means of a lug 11 entering into a recess in a turned up flange 12 of the bottom 6. Above the discs 8 and beneath the conical part of the casing 10 is disposed a conical cap 13 maintained by means of ribs 14 at a certain distance from the same so as to secure a free milk discharge.

The cap 13 has at its top a cylindrical portion 15 and is at its upper end turned inwards as shown at 16 so as to join to the central pipe above the milk outlet so that the cap will effectively prevent a leakage of the skim milk to the cream and vice versa.

In the central pipe 1 is at the upper external part arranged an axial channel 17 and the cylindrical part 16 of the cap is provided with a tongue 18 filling the section of the channel completely. In this tongue is threaded in a regulating screw 19 for the cream discharge. In this screw is arranged a recess 20 the section of which is decreasing upwards. By turning the screw 19 so that the recess will obtain a greater or less distance from the axis the cream quantity will be increased or decreased, the centrifugal action upon the cream being greatest when the discharge opening has its outer position.

If it is desired to regulate the cream quantity to a greater degree the tongue 18 may be provided with a limited recess at its upper edge suitably at its outer part so that the opening 20 in the screw 19 may be adjusted so as to correspond to the recess effecting a considerable increase of the size of the cream outlet.

Outside the cylindrical part 16 of the cap is the lower part 21 of a nut 22 threaded upon the pipe 1. In this nut is recessed an annular groove 23 into which the cream may stream from the regulating screw 19. From this groove the cream may be discharged from the bowl through vertical channels 24.

The milk streaming upwards in the space between the casing 10 and the cap 13 may be discharged through radial holes 25 the number and size of which may be adapted to the intended capacity of the bowl the throttling taking only place when the milk is being discharged through these holes.

The nut 22 suitably has a cylindrical form fitting to the upper cylindrical part of the casing 10.

Claims:—

1. In a centrifugal separator, a central pipe, a disc therearound, a conical cap around and spaced from the disc and having an inturned flange at its upper end, fitting closely around said pipe and provided with a tongue, the said pipe having a recess into which the tongue extends and said tongue having an opening, and means to regulate the discharge of cream through said opening.

2. In a centrifugal separator, a central pipe, a disc therearound, a conical cap around and spaced from the disc and having an inturned flange at its upper end, fitting closely around said pipe and provided with a tongue, the said pipe having a recess into which the tongue extends and said tongue having an opening, and a closure threaded in said opening and having an upwardly contracting duct for the regulated discharge of cream through said opening.

3. In a centrifugal separator, a central pipe, a disc therearound, a conical cap around and spaced from the disc and having an inturned flange at its upper end, fitting closely around said pipe and provided with a tongue, the said pipe having a recess into which the tongue extends and said tongue having an opening, means to regulate the discharge of cream through said opening, and a nut screwed on said pipe and bearing on said flange, said nut having a groove on its inner side and channels leading upwardly from said groove.

In witness whereof I affix my signature.

LUDVIK RASCH.